March 25, 1958 G. J. SISSINGH ET AL 2,827,968
CONTROL OF HELICOPTER STABILITY BY INERTIA DEVICE
Filed Nov. 2, 1954 3 Sheets-Sheet 1

GERHARD J. SISSINGH
ROBERT R. KENWORTHY
INVENTORS.

BY *Frank H. Borden*
ATTORNEY

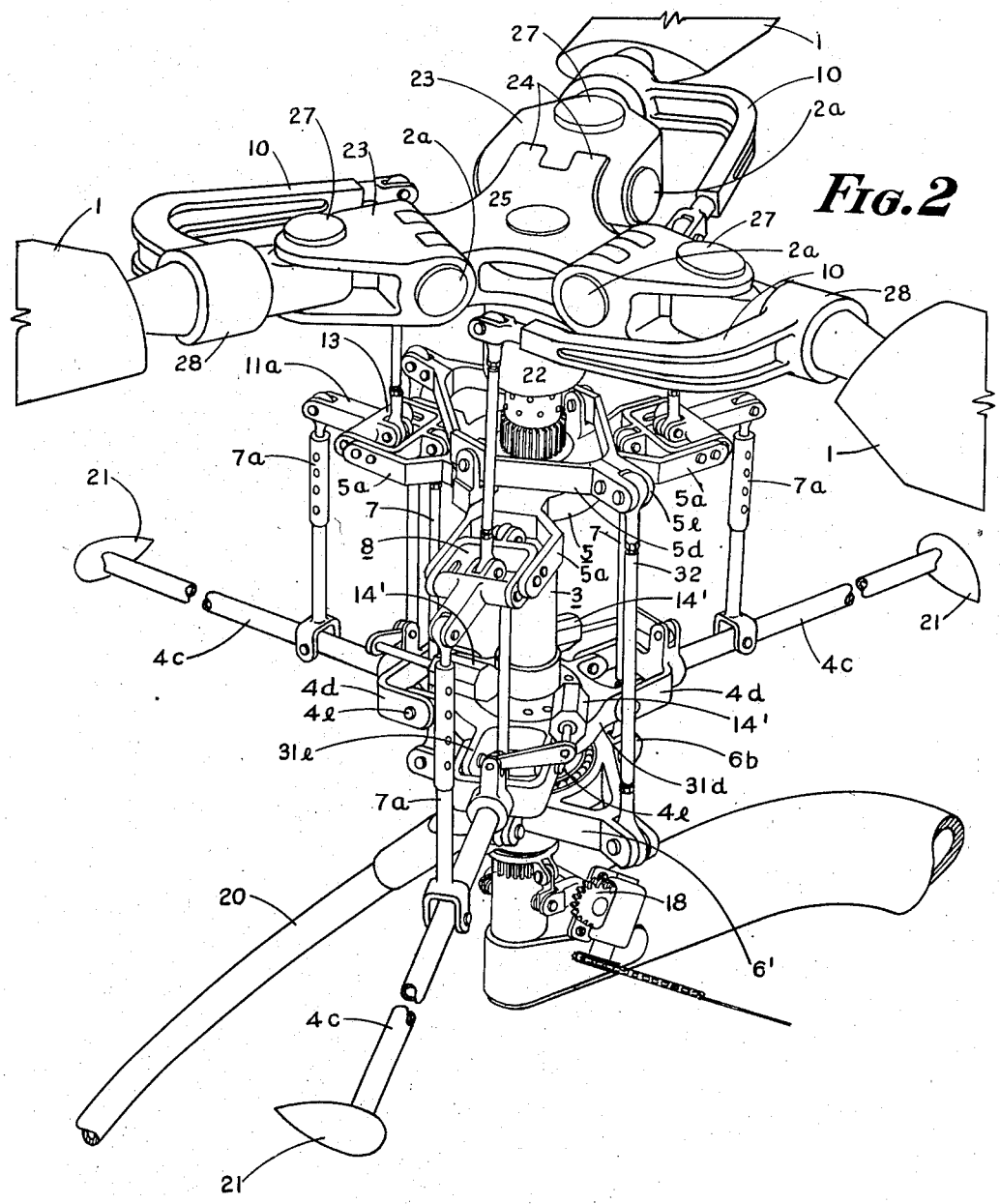

United States Patent Office 2,827,968
Patented Mar. 25, 1958

2,827,968
CONTROL OF HELICOPTER STABILITY BY INERTIA DEVICE

Gerhard J. Sissingh, Haddonfield, N. J., and Robert R. Kenworthy, Philadelphia, Pa., assignors, by mesne assignments, to the United States of America as represented by the Secretary of the Navy Application November 2, 1954, Serial No. 466,406

6 Claims. (Cl. 170—160.13)

This invention relates to the stabilization and control of helicopters.

In prior efforts to effect such control the helicopter rotor has had associated with it an inertia device. The device has taken the form of a flywheel, sometimes driven at a faster rate than the rotor of the helicopter; but generally it has been in the form of an inertia stabilizer bar or rod mounting terminal masses and pivoted to and rotated by and with the rotor. As the rotating inertia device through gyroscopic action tends to remain in its plane of rotation normally perpendicular to the axis of rotation of the rotor hub and blades, any disturbance in pitch or roll effecting disturbance of the rotative axis of the rotor relative to the plane of rotation of the inertia bar, effects a relative angular displacement therebetween. By link and lever systems this displacement has been utilized to effect pitch changes in the blades of the rotor in the proper sense to damp the disturbance and stabilize the rotor. This automatic functioning has been complicated by the necessity for also providing pilot-actuated collective pitch control for elevation changes, and cyclic pitch control for translational flight.

While the inertia bar as previously developed and used has effected improvements in stabilizing helicopters, the improvement has been of variable effectiveness over large portions of the speed range of the helicopter, being at its best through a minor portion only of such range. There is a fundamental defect in such prior systems in the fact that as constituted the inertia bar forms a movable fulcrum for the blade pitch control linkage and thus introduces changes in the rate of motion into the rotor blade pitch control supposed to damp out violent or over-controlled reactions from the rotor blade pitch control.

Moreover, it is important to note that in all helicopter organizations publicized to date using stabilizer bar or like inertia damping, the teetering stabilizer bar has been combined with a teetering or rocking relatively rigid, two bladed rotor system. This has inherent functional limitations owing to the large moments of inertia of such system among other adverse factors. It is inevitable that inferior functioning results from the continuous compromise between the aerodynamic and mass characteristics in the mean flapping position of both blades of the rigid, two bladed teetering system, as contrasted with the more flexible characteristics of individually flapping mutually independent blades. The importance of this factor will be appreciated when it is recognized that the smaller moment of inertia of the stabilizer bar must act upon the blade pitch change linkage to overcome the far greater moment of inertia of the two bladed rigid teetering rotor. The feed-back values of blade pitch from two blades in aggregate are not the ideally required values for each blade considered independently. In terms of time or sensitivity in overall effect such rigid teetering system, in its most favorable aspect, leaves much to be desired and appreciable room for improvement. Such control sensitivity limitations are imposed by rigid and teetering two bladed systems by their serious compromises in flapping and cyclic pitch control demands.

It is also noteworthy of the prior art helicopters using the inertia device as a teetering stabilizer bar with the rigid two bladed teetering rotor, that it has been found essential to provide some form of frictional resistance on the pilot's control stick, to partially absorb the feed-back forces passing into the stick. By such prior art practices the friction is introduced mechanically into the control stick mechanism as an adjustment in order to impose some restraint other than or additive to that which can be secured from the proper interplay of the stabilizer and the blades. It has been observed that in the prior art devices under discussion, when the stick friction adjustment is low or off, with a consequent low or absence of frictional restraint, the craft cannot be flown "hands-off," even for a very short interval. There is no mechanical irreversibility in this system. It is clear in theory and has been borne out in practice that the necessary working characteristics comprehending both automatic stability and control sensitivity requirements, for the full range of flight speeds, are not available from the prior art organizations.

It is among the objects of this invention to provide a helicopter with coordinated stability and control effective throughout the entire flight range of the helicopter; to provide a coordinated stability and control linkage for helicopters utilizing an inertia device, in which fixed reference fulcrums are used which are located independent of inertia bar setting or change of setting; to utilize a rotor of a helicopter incorporating a plurality of independent flapping blades, with an inertia bar stabilizing control; to provide in a helicopter a plurality of respectively independent flapping blades, a pilot's control of cyclic pitch, and of collective pitch, of the respective blades, and an inertia device for automatically damping pitch and roll disturbances of the rotor with such inappreciable feed-back into the stick as to substantially obviate frictional restraints on the pilot's cyclic pitch control; to provide in a helicopter a blade pitch control link, a control integrating, leverage mixing chamber including a predeterminedly functionally fixed and stationary pivotal axis, said chamber being responsive to inputs of cyclic pitch control by the pilot, and damping control by an inertia device, to actuate said blade control link as an output functionally with the sum of or the difference between inputs from said two input sources; to provide a helicopter with inertia bar stabilization and pilot's cyclic pitch control in which an appreciable time lag exists between the application of pitch or roll forces to the stabilizer bar and the output blade pitch change, whereas there is no time lag between the pilot's control input and the output blade pitch change; to provide a helicopter with flapping blades of variable pitch, and an inertia bar stabilizer and a pilot's cyclic pitch control, with means by which the latter interact for optimum stabilized conditions throughout substantially the entire speed range of the craft; to provide a helicopter rotor with independently flapping blades, an inertia bar stabilizer, and a pilot's control, in which dynamic stability and satisfactory control sensitivity are available regardless of the size of the rotor, the speed of the aircraft or the loading of the rotor; to provide in a helicopter a fixed reference plane mounting fulcrum pivots of a control integrating, leverage mixing chamber having plural inputs and a single output, in association with a teetering stabilizing bar and a pilot's cyclic pitch control, forming respectively the plural inputs to the chamber, and a connection between the chamber and a blade to vary the angular incidence thereof as a resultant or composite of the mutually cancelling or mutually additive effects of the respective inputs; to provide in a helicopter a pilot's control for cyclic pitch changes of the blades of the rotor system of the helicopter, with an inertia device with controls for automatically effecting pitch changes of the blades of the rotor to damp disturbances, while restoring the rotor system to the condition determined by the instantaneous pilot's pitch control setting; to provide in a helicopter plural flapping blades mounted on flapping blade pivots, a pilot's blade pitch control, an inertia device for automatic blade pitch control, with the pivots of the respective flapping blades in predetermined mutual relative hinging to effect optimum control sensitivity throughout the entire flight range; to provide a helicopter with a stabilization and control system in which feedback forces on the pilot's control are so minimized that "hands-off" flight in any given flight regime can be accomplished without the imposition of a frictional restraint on the pilot's control; to provide a helicopter incorporating two or more than two blades in which stabilization and control can be effected on an optimum basis through the entire flight range; and to provide other objects and advantages as will become apparent as the description proceeds.

In the accompanying drawings, forming part of this description:

Fig. 1 represents a perspective of an illustrative two bladed helicopter rotor assembly, in which the blades have horizontal flapping hinges for independent blade flapping, a control leverage mixing chamber is mounted to operate relative to a predeterminedly functionally fixed horizontal pivot, susceptible to predeterminable vertical adjustment synchronously with the vertical adjustment of a pilot's control swash plate, and into which mixing chamber there may be a cyclic pitch control input, according to swash plate angle, and into which mixing chamber there also may be a damping control input from an inertia device, and from the mixing chamber there extends a single pitch control rod connected to an offset horn on a blade mounting, to deliver a resultant thrust force from the mixing chamber to the blade.

Fig. 2 represents a similar perspective of a helicopter rotor exemplifying the invention, in an illustrative three blade organization, modified to accord with the fact that the rotor mounts more than the two blades of Fig. 1.

Figure 1:
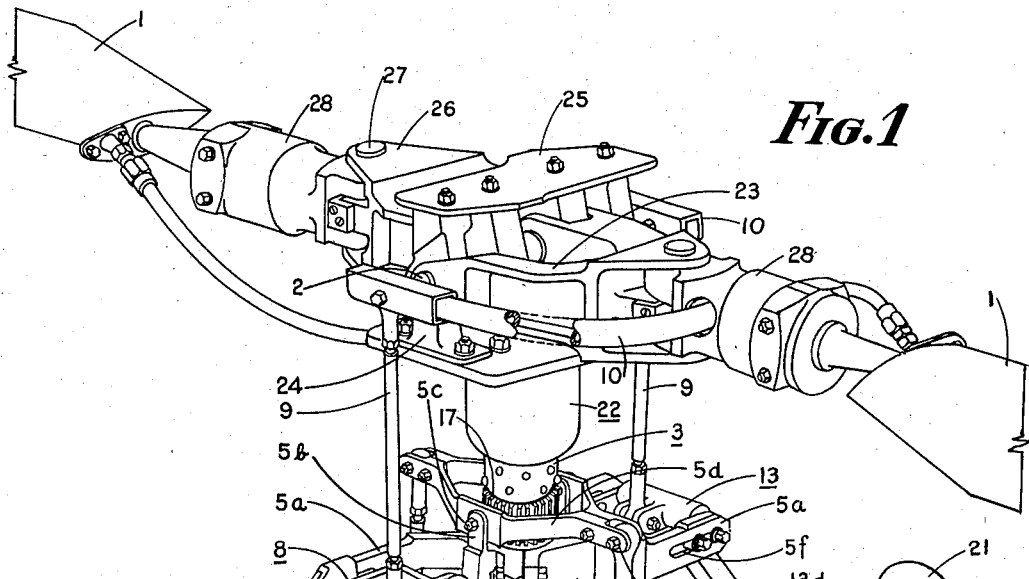

The mast 3 is suitably journalled for rotation relative to the fuselage (not shown), and defines the normally vertical axis of rotation of the rotor hub 22. The hub 22 is provided with an illustrative four, blade-mounting or attaching brackets 24, and a top plate 25. The mounting brackets 24 are apertured diametrically of the axis of the rotor system to receive a hinge pin, or plural hinge pins, 2. The aligned apertures for a single pin 2 in the mounting brackets lie in a first diametrical vertical plane passing through the axis of rotation. This is an important plane of reference for the location of parts to be described, as well as comprising the plane of maximum control functions. It will also be understood that a second vertical diametrical plane of reference passing through the axis of rotation is referred to for the location of other parts to be described. This is the plane of minimum control functions. The second plane is preferably normal to the first, but may be at a different angle, as will be pointed out. The center line of sight at the mast and hub of Fig. 1 substantially bisects these two planes of reference.

The spaced yoke ends of the respective blade root flapping hinge links 23—23, selectively, overlap each other to the degree necessary to mount both yokes on a common pivot or hinge 2, may overlap further to mount the yokes on parallel spaced pivots in a negative sense of separation, or may be separated to have no overlap at all so that the pivots are in parallel positively spaced relation, according to the control results sought, as will be explained. These separation or no separation setting values can be changed by the relative shifting of pairs of mounting brackets 24, transverse of the axis of the apertures for the pins 2, as will be clear.

The flapping hinge links 23—23 are formed with outer fork lugs 26—26 drilled to receive vertical hinge pins 27—27, the axes of which are in said second diametric plane. Blade root pitch change fittings 28—28 are pivoted at their inner ends to the flapping hinge links 23—23 at the respective hinge pins 27—27, and at their outer ends journal the respective blades 1—1 for oscillations about axes passing longitudinally or spanwisely of the blades. It will be noted that the blades thus and preferably have freedom of lead-lag motions on pivot or hinge pins 27. It is pointed out that the individually flapping blades just described have appreciably smaller moments of inertia than the teetering or see-saw type of rigid two bladed assembly of the prior art.

The blade root pitch change fittings 28—28 each mount a pitch control horn 10, partially broken away and indicated in dotted lines for clarity in Fig. 1, having a free end offset from the blade root fittings and disposed generally beside the hub and its associated blade mounting devices.

The helicopter rotor system is driven by any desired force, whether by the torque of an internal combustion engine as is common in the art, or by reaction devices on the blade tips as is also common in the art. The device of Fig. 1 is illustratively driven by blade tip reaction motors or rockets. With this organization a tail rotor (not shown) is provided for steering control and not for anti-torque.

An important and novel feature of the invention is the provision of platform 5 mounted on and extending perpendicularly of mast 3. The platform, both at rest and in rotation, constitutes a transverse datum plane of reference containing two functionally fixed parallel diametrically spaced fulcrum axes or pivots, to be described, and the said datum plane is always normal to the mast in every attitude thereof, as it may change in pitch and roll.

In order to provide for collective pitch changes and controlled rotation, the platform 5 is mounted on splines 17 on the mast, which prevents relative rotation about the mast in azimuth.

The platform 5 is comprised of rigid, oppositely extending, pairs of parallel spaced arms 5a—5a, symmetrical of said first diametric plane. It also mounts supporting posts 5b—5b on opposite sides of the mast, having aligned pivotal apertures to receive pivot pins 5c symmetrical of said first diametric plane, to pivotally engage a supporting tilting unit 5d. The latter has a pair of oppositely extending mounting lugs 5e symmetrical of said second diametric plane.

Each pair of spaced arms 5a is provided with aligned horizontal fulcrum axis apertures 5f, the axis of which is in a line parallel to said second diametric plane. These aligned apertures of a pair of spaced arms 5a—5a or any other desired pivotal organization, constitute the fixed fulcrum for the mixing chamber, to be described. These two fulcrum axis apertures 5f lie in a datum plane of reference always normal to the axis of mast 3 and in fixed spacing relative to the axis of mast 3.

The leverage mixing and integrating chambers are centered or focused on the respective fulcrum pivot axes.

To this end straddle yoke links 8—8 are provided, each of generally U-shaped rectangular section, comprising spaced parallel legs 8a—8a (Fig. 3) connected by a base portion 8b, with two pairs of aligned pivotal apertures, respectively 8c and 8d, formed in the respective legs. The base portion 8b mounts an attachment lug 8e extending away from the legs 8a. The straddle yoke links are disposed so that the fixed fulcrum axis 5f of the rigid platform arms is transversely aligned with the pivotal apertures 8c, and suitable pivot pins 8f are disposed in the aligned apertures and comprise the fixed fulcrum axes for the mixing chambers. The straddle yoke links 8 are constituted, in the instant illustrative case, as levers of the first class. It will be seen that rocking of a link 8 on the fulcrum pivot pin 8f moves the attaching lug 8e, and the aligned pivot apertures 8d, on relatively small arcs in opposite directions. Preferably the first lever arm from the fixed fulcrum 8f to the attachment point of the mounting or attachment lug 8e is appreciably longer than the second lever arm between the fixed fulcrum 8f and the axis of the other aligned apertures 8d.

Rocker links 13—13 also, illustratively, constituting levers of the first class, are pivotally mounted on the straddle yoke links on an axis coincident with the apertures 8d—8d thereof. This mounting is by means of the barrel portion 13a, as by a pivot pin 13b. The rocker links 13 have attaching lugs 13c extending radially inwardly toward the mast, defining with pivot pin 13b a third lever arm. A downwardly and outwardly projecting suspended arm 13d extends from the opposite side of the barrel 13a, and defines from its cross link to be described, and pivot pin 13b, a fourth lever arm.

Figure 3:
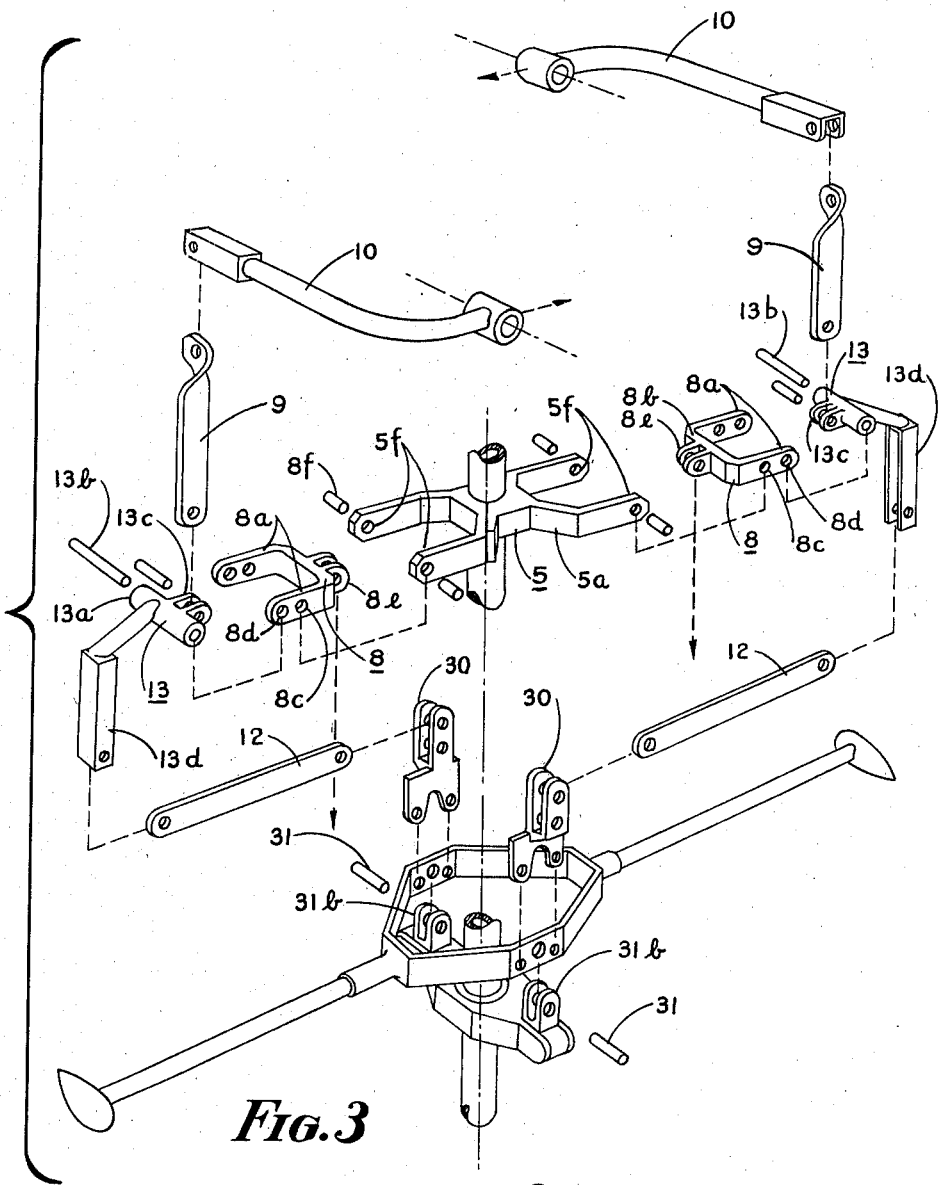
Fig. 3 represents an exploded perspective of some of the elements comprising the datum plane platform and the leverage mixing chamber and the functionally fixed fulcrum pivot thereof, according to the disclosure of Fig. 1.

It will be understood that although in the skeleton form shown in Fig. 3 but single sets of apertures are disclosed, this is for simplicity and all of the linkages can be pivoted on variable lever settings as by providing aligned series of pivotal apertures on the proper parts, and on the depending arm 13d, so that the ratios of lever arms involved can be selectively predetermined and changed according to desired control functions sought. This is true of all other lever arm and link relations of other parts to be described. It will also be evident that constituting straddle yoke links and the rocker links as levers of the first class is convenient and is preferred, although, obviously, either or both could be organized as other classes of levers with the same important functions. It is only necessary that the mixing chamber have two parallel control inputs and a single integrated control output to be described, operative relative to a functionally fixed fulcrum, the datum position of which is independent of the position or change of position of the inertia device to be described.

The mast 3 has a pair of diametrically oppositely mounted dampers 14—14 which, illustratively, are of the viscous type, each damping the motion of a lever 14a, in its limited motions in a plane normal to the axis of the mast. Below the viscous dampers a fixed bracket 31a is clamped to the mast 3 and is provided with rigid mounting posts 31b, symmetrical about said second diametric plane, to form the pivotal support for the inertia device, such as the inertia bar or rod to be described. A swash plate 6 is mounted on a swash plate organization 29, universally mounted on a splined unit for permitting vertical adjustment for collective pitch change, to be described, without any rotation relative to the hub.

A pilot's control stick 20 is provided for controllably changing the attitude of the plane of the swash plate 6 to the axis of rotation of the mast. Any desired means may be provided for effecting vertical motions of the swash plate organization for collective pitch change, as is common in the art. Illustratively, this is effected by a conventional worm and wheel unit 18, which raises or lowers or holds the swash plate 6, through an appropriate torque tube and lever device. Th swash plate 6 has a pair of oppositely projecting datum-plane support connecting-rod mounting lugs 6a—6a symmetrical of said second diametric plane, and at 90° therefrom, symmetrical with the first diametric plane, has a pair of oppositely projecting straddle yoke link connecting-rod mounting lugs 6b—6b.

Figure 4:
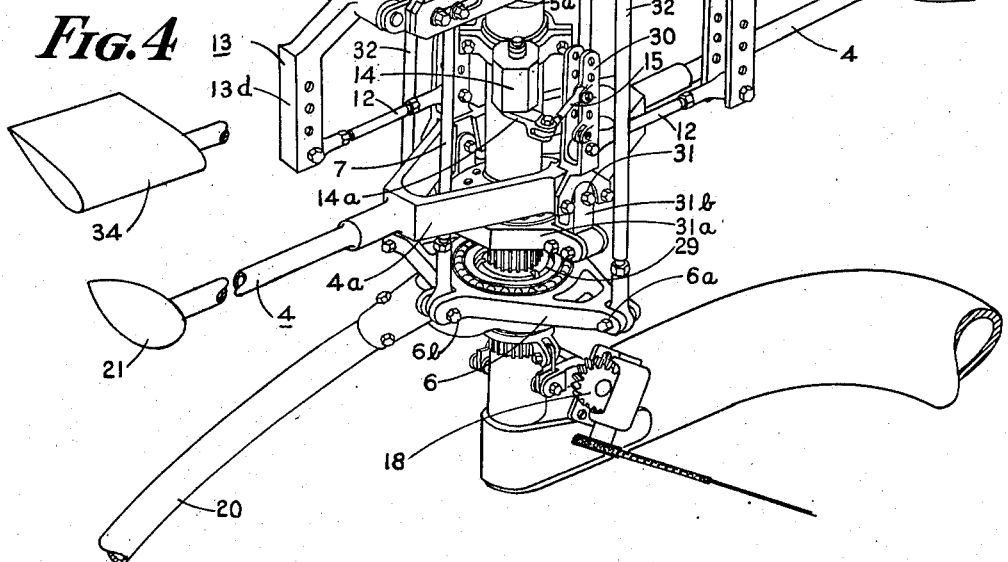
Fig. 4 represents a fragmentary perspective of a terminal end of a modified form of damper for the inertia means applicable to the forms of invention of Figs. 1 and 2, in augmentation of the viscous dampers shown, or in substitution therefor.

An inertia device is provided, illustratively comprising a bar or rod 4, the central portion of which is of generally oval open contour, as at 4a, which latter rigidly mounts the diametrically spaced upstanding bell crank lever arms 30—30, normal to the plane of rotation of the inertia device. In the normal rotative path attitude of the inertia device, in a plane normal to the axis of the mast, the arms 30—30 are parallel with the axis of the mast. At the terminals of the rod 4, weights or masses 21 are mounted. These may be mere streamlined masses, when the dampers 14 (above described) are provided, or, in any case, may be incorporated in preferably fixed relatively small airfoil surfaces 34, as shown in Fig. 4. The inertia device 4 and 4a is pivoted on a vertically fixed axis 31 on the posts 31b of the clamped bracket 31a. This pivot disposition is such that the vertical plane of teetering is in predetermined phase relation to the blade span axis, according to the angular relations of said first and second diametric planes. This relation is usually normal, but may have a lag or lead angle.

Owing to the masses involved, the inertia device or unit in rotation tends to resist relative angular change of its rotative plane, as with pitch or roll of the helicopter or in return to its normal plane. The airfoil surfaces, if used, effect differential lift effects on opposite ends of the inertia bar to decelerate or damp the motion of the plane of rotation out of normal, or the return of the inertia bar to its normal plane of rotation after a disturbance. The airfoil surfaces 34 are preferably at zero incidence in the normal rotative path of the inertia device (normal to the axis of the mast 3). Upon disturbance of the helicopter in pitch or roll the inertia device has its gyroscopic moment overcome. This causes the effective angle of attack or incidence of the respective airfoil surfaces to alter, substantially reciprocally, on opposite airfoils, exerting a damping action on the inertia device. This damping may be used alone, or in combination with dampers 14, to be described.

With the foregoing items of apparatus as thus described, the important interconnections therebetween will be more readily understood. In this connection, in all of the links and rods to be described hereinafter it will be understood that if desired each may be susceptible to adjusted axial elongation or retraction as by being provided with telescopic portions, the terminal connections with the various attaching lugs or the like may be of universal or ball and socket types of connections or may comprise single plane pivots, and further that wherever a rod or link connects with a given part it may be through a selected adjustable connection with reference to the pivot of the part being coupled to select the lever ratio involved.

In order to effect collective pitch changes push-pull rods 32—32 respectively pass outside and clear of the inertia device 4, etc., and connect between the swash plate lugs 6a—6a and the mounting lugs 5e—5e respectively, on the tilting supporting unit 5d. These connect the swash plate and the tilting supporting unit and therefore the platform 5 in a parallel series symmetrical of said second diametric plane, so that they move vertically together for collective pitch changes when the motivating worm and wheel organization is actuated in the selected sense, whereas the angular changes which the swash plate plane undergoes in cyclic pitch control are provided for in the universal fittings at the ends of rods 32—32. Swash plate pitch control rods 7—7 symmetrical of said first diametric plane pass through and clear of the central portion 4a of the inertia device and connect the straddle yoke link mounting lugs 6b—6b with lugs 8e and 8e on the respective straddle yoke links 8—8 of the leverage mixing or control integrating chamber. It will be seen, therefore, that there is no direct connection between the pilot's cyclic pitch control and the inertia device. It will also be observed that with swash plate angles such as to effect pitch control thrust forces on the straddle yoke links of the mixing chamber, the latter simply rock in both senses in a complete cycle of the rotor, and this raises and lowers the pivot pin 13b of the respective rocker links 13 in a ratio determined by the lever arms involved. This is one control into the mixing chamber.

Pitch control links 9—9 are connected between the free ends of the horns 10 and the lugs 13c on the respective rocker links 13. The free ends of the depending lever arms 13d on rock links 13 are connected through universally pivoted generally horizontal links 12—12, to the respective upstanding bell crank arms or posts 30 on the inertia device above the pivot 31 thereof in a selected variable spacing therefrom. These inertia bar posts 30—30 are also respectively connected through respective links 15—15 in a selected variable spacing from pivot 31 to the free ends of the damped lever arms 14a, if, as noted, these dampers are found desirable.

It will be clear that with the linkages described, regardless of the instantaneous vertical setting of the platform 5, which is functional with the instantaneous vertical setting of the swash plate organization, the subsequent vertical motion of the platform 5, raising or lowering the fixed fulcrum pivots 8f, imparts a direct collective pitch control on the respective blades, regardless of any incidental cyclic pitch control superposed thereon, whether from the pilot's cyclic pitch control or from reactions from the inertia bar arising from pitch and roll disturbances.

Let it be assumed that the collective pitch control is stationary, that there are no extraneous disturbances in pitch or roll, and the inertia device is disposed in its rotative path normal to the axis of rotation of the rotor system, and the pilot then changes the attitude of the swash plate for a cyclic pitch control function. So far as control linkages through rods 32—32 are concerned, nothing happens except possibly incidentally to change the degree of oscillation of the tilting support device or unit 5d of the platform 5. However, differential actuation of the pitch control rods 7—7 sets up a cyclic oscillation of straddle links 8. As noted, this cyclically raises and lowers the pivotal axes 13b of the respective rocker links 13. As the bell crank arms 30—30 of the inertia device are rigid and gyroscopically fixed, the cross links 12—12 are instantaneously immovable, so that the position of the suspended or depending lever arm 13d of the rocker links is fixed to substantially prevent motion of the rocker links 13 on their pivots 13b. Consequently, the controlled oscillation of the straddle yoke links under the control from the swash plate, being substantially incapable of actuating the rocker links on their pivots, raises and lowers the entire rocker link assembly to raise or lower the push-pull pitch control links 9—9 to cyclically change the pitch angles of the blades. The elevation of the pivot of one rocker link and thus of the entire rocker link assembly without appreciable angular motion of the rocker link on its pivot, raises its push-pull rod while the opposite rocker link is being depressed substantially without angular motion on its pivot, and lowers its push-pull rod 9. As the degree of pitch change is a function of swash plate plane adjustment, any desired cyclic pitch change can be effected. There is substantially no time lag between the pilot's control rod actuation and the pitch control rod actuation. In this case the inertia device is a fixed fulcrum element from which the controls react, and owing to the favorable linkage ratio the moments developed against the inertia device are of smaller magnitude than the moments of inertia of the inertia device, which has insignificant reaction from the force increment available on the cross links 12—12.

Let it now be assumed that with the pilot's control substantially fixed in a given cyclic pitch control swash plate attitude, resulting in a cyclic oscillation of the straddle yoke links and a cyclic arcuate elevation and lowering of the pivots of the rocker links as just described, and a consequent direct cyclic pitch change of the respective blades, as just described, and there is a disturbance, causing the mast to move in pitch and roll. Regardless of its source, it is this pitch or roll type of mast oscillation that must be damped. As the inertia device, for a short interval, stays in its initial plane of rotation, and this is angularly divergent from the mast axis as a result of the disturbance, the bell crank lever arms 30—30 on the inertia device move relatively arcuately about the axis 31 of the inertia device, thus respectively pulling on one rod 12 and pushing on the other, in cyclic alternation, while being damped by the dampers 14, if used, or by the airfoil sections on the tip weights of the inertia device, if used, or by both. It will, of course, be understood that although the dampers 14 are preferably of the viscous type, they may be of any other desired type. The reaction to the disturbance imparts rocking oscillations to the rocker links 13 in the mixing chamber, pulling down on one pitch control link 9 and pushing up on the other in such senses as to so change the pitch angles of the blades as to damp the disturbance which has manifested the pitch or roll. This is the other control introduced into the mixing chamber.

It is pointed out that the inertia of the bar 4, etc., effects a degree of restraint which reacts onto the actual quantity or rate of motion passing into the rotor blade control links following the initial impact of the disturbance. In ultimate effect this introduces a time lag into the pitch control reactions. This time lag permits the inertia unit to smooth out the actual control forces, thus reducing any tendency to over-control.

It will be recognized also that with the swash plate in a given setting when a disturbance effectively tilts the mast, the inertia bar reaction causing cyclic rocking of the rocker links 13 on their pivots 13b, by reason of the favorable leverage ratio has inappreciable disturbing reaction on the straddle yoke links 8 on their pivots 8f, so that the reaction onto the swash plate and into the pilot's control is inappreciable and by suitable selection of the leverage ratio to and from the mixing chamber, can be caused to be negligible to the degree necessary to permit "hands-off" flight of the helicopter.

Mention has been made of the functional fixedness of the fulcrum pivots 8f of the mixing chamber. This is an important attribute of the platform 5 in establishing a datum plane passing through these pivots, always normal to the axis of the mast, and functionally fixing them in this angular relation as well as in spacing radially of the axis of the mast. It is pointed out that this functional fixation is maintained despite or during collective pitch change, and is not affected in any manner whatever by the attitude or change of attitude of the inertia device.

It will be evident that in the apparatus shown in Figs. 1 and 3, the blades are independently hinged so that each is free of the other in its angular displacement flapping in a vertical direction, and that, although the stabilizer bar is mounted on a single teetering hinge, its connecting linkages to the individual rotor blade pitch control levers are separate from each other. In contrast to all other known systems utilizing inertia devices for damping, the control linkages of the instant invention by-pass the stabilizer device, passing through or across or away from same to the composite platform establishing the datum plane for the functionally fixed fulcrum axes 8f normal to the axis of rotation.

Pursuant to angular displacement of the ship, the fixed reference datum plane containing the fixed fulcrums moves with the ship, but the stabilizer bar on inertia device, owing to its gyroscopic properties, tends to resist the angular displacement and is relatively slow to follow into its new course. The rate of following depends upon the degree of damping by the airfoils 34 and/or dampers 14. It remains in its original plane for a brief time interval. When finally displaced, it reacts through the same linkages in the mixing chamber in parallel, in a sort of fulcrum reversal therein, in that the basic fulcrum 8f on which the straddle yoke links are pivoted may be stationary, depending upon cyclic pitch from the swash plate, and the rocker link fulcrum 13b is the axis about which the actions take place to cause actuation of the pitch control rods. Thus, automatically, without any corrective function by the pilot, the disturbance is damped by the functioning of the inertia bar.

It is repeated that the characteristics of this automatic control can be designed for optimum conditions throughout the entire flight range of the ship. Because of the favorable leverage ratio operating through the rigidly mounted linkage to the inertia device, the latter yields at a rate of motion predetermined by its moment of inertia, plus its damping. There is an interval of time lag in the automatic control function which the inertia device permits to flow into the control system following the pitch or roll disturbance but little, if any, time lag in the necessary cyclic control by the pilot. The effect of such control displacement as the pilot puts into the system is mildly damped by the inertia device. The control effort by the pilot, having a predetermined mechanical advantage, enables him to override the stabilizer when any disturbance may be present in the rotor. With the exact proportions of ratios between the blades, the inertia device and the control stick forces established, bringing the inertia device reactions to the disturbances, and bringing the pilot's control impulses into the correct ratio, the necessity for any frictional restraint on the pilot's control is obviated. A wide range of control sensitivity can be predetermined and effected in the control system without material impairment of the automatic dynamic stability.

It is an important feature of the invention that the basic principles exemplified by the two blade rotor system disclosed in Fig. 1 can be incorporated in rotors of three or more blades to equally good advantage. This is a characteristic of the system which cannot be secured in a rigid teetering type of rotor.

Referring to Fig. 2, the rotor has the same mast and hub type of support, but the hub has, illustratively, three pivotal supports mounting the blade root flapping hinge links 23 on pivot pins 2a. The flapping hinge links and the remainder of the blade organizations are the same as in Fig. 1. The same sort of datum plane platform device with the fixed fulcrum pivots is provided with the same connections to the swash plate organization as in Fig. 1. However, the datum plane fixing platform, on which the datum plane fulcrum pivots are located, is modified by having three pairs of parallel arms 5a symmetrical about three first diametric planes, at 120° spacing, and which latter respectively bisect adjacent pairs of three second diametric planes, which are normal to the respective pivot pins 2a. The pairs of spaced arms 5a—5a of the platform are evenly spaced angularly in azimuth, but the supporting tilting element 5d of Fig. 2 is modified in that the diametrical plane of the mounting lugs 5e is shifted a few degrees whereby the push-pull rod or link 32 from the swash plate on one side is slightly off-set angularly from symmetry between adjacent pairs of arms 5a—5a, while rod 32 on the other side of the mast is off-set angularly so as not to contact the remaining pair of arms 5a—5a or the mixing chamber mounted thereon. To the same degree and for the same purpose the swash plate 6', while having the three straddle yoke links 6b symmetrically spaced about the axis of the mast, at 120° spacing, has the datum plane connecting rod mounting lugs 6b in the same slightly off-set diametrical plane.

The bracket 31d, clamped to the mast, has three pairs of spaced lugs 31e, extending parallel to the respective pairs of arms, symmetrical of the respective three first diametric planes. The inertia device is comprised in this case of three individual rods 4c, each having an inner yoke 4d pivoted on pins 4e to the respective pairs of lugs 31e. Each inertia device at its free end mounts a mass, as with the inertia device of Fig. 1. This mass may be of airfoil contour to effect inertia device damping. In selectively spaced relation to the inertia pivot pin 4e, a telescopically adjustable link 7a is pivoted at its lower end to each of the individual rods of the inertia device. At their respective upper ends links 7a are pivoted to the respective lever arms 11a of the rocker links 13. Any other or additional inertia damping means, such as at 14', may be provided for the individual rods of the inertia device, similar to the dampers 14 of Fig. 1, but modified to respond to a different direction of the control.

In operation, the respective individual components of the inertia device, during normal rotation, assume the same rotational plane which is perpendicular to the axis of rotation of the mast, and a disturbance of the mast in pitch or roll causes the plane of rotation to shift, as with the single teetering bar of Fig. 1, with consequent cyclic control into the respective mixing chambers and into the blade pitch linkage.

The functioning of the multi-bladed device of Fig. 2, which although of but three blades is representative of any plurality, is the same as Fig. 1, and will be understood from the preceding description. It is pointed out that in both of the forms of invention with the flapping blades disclosed, each blade is free of the other in its angular flapping in vertical planes. While the inertia device of Fig. 1 is mounted on a single teetering hinge and that of Fig. 2 on a plurality of individual hinges, the connecting linkages to the individual rotor blade pitch control levers are independent of one another.

The objects and advantages of the invention will be evident, and have been substantiated by flight tests of a small one-man helicopter, which is notoriously most difficult to control.

While the invention has been disclosed in a given embodiment thereof, it will be evident that many changes and modifications may be made by those skilled in the art without departing from the spirit of the invention or the scope of the appended claims, and it is not necessary nor desired that the invention be considered as limited to the exact structure shown and described.

Having thus described our invention, we claim:

1. A rotor for helicopters comprising a plurality of blades individually hinge-mounted in a common plane for rotation about a common axis, pitch change mechanism associated with each blade, inertia means pivoted to the rotor in a common plane and in predetermined phase relation to the blade span axis, a rigid platform mounted on the rotor establishing a datum plane normal to the axis of rotation of said rotor and disposed between the first and second mentioned common planes, swash plate means mounted on the rotor below the inertia means, first lever means pivoted on said platform on fulcrum axes lying in said datum plane, control link connections between said swash plate means and said first lever means intersecting and passing beyond said inertia means without direct engagement or contact therewith, second lever means pivoted on the first lever means having one arm connected to said pitch change mechanism for a blade, linkage connection means between another arm of said second lever and said inertia device, whereby the pitch change mechanism is cyclically actuated as a resultant of the pilot's control on one lever and the inertia device control on the other lever.

2. A helicopter comprising a rotor, blades pivoted for flapping relative to the rotor, pitch change means for said blades, an inertia device, first control means operable by changes in the relative angle between the rotor axis and the inertia device, second control means operated by the pilot for cyclic pitch control, supporting means mounted on said rotor and having fulcrum pivots lying in a datum plane always normal to the axis of said rotor, a lever of the first class mounted on said respective fulcrum pivots and connected to one of said control means for cyclic oscillation, a second lever of the first class pivoted on said first lever and connected to the other of said control means for cyclic oscillation, said last mentioned lever connected to said pitch control means for effecting a resultant cyclic control function on said pitch change means.

3. A helicopter rotor system comprising a rotatable unit, a rotor blade pivoted for flapping relative to said unit, a pitch control arm associated with said blade, datum plane means mounted for rotation with said unit and having a median plane of rotation always normal to the axis of rotation of said unit, function means on said datum plane means lying and functionally fixed in said median place of rotation, rotatable inertia means pivotally mounted relative to the unit and having a plane of rotation normally perpendicular to the axis of rotation but responsive to disturbances of the unit in pitch or roll to cause said last mentioned plane of rotation to move out of the perpendicular relative to said axis, a pilot's control means, a lever pivoted on said functionally fixed fulcrum means, a connection between said pilot's control means and said lever and defining with said fulcrum pivot a first lever arm, a second lever mounted on the first lever on a second pivot, which latter defines with said fixed fulcrum pivot a second lever arm, a connection between said second lever and said pitch control arm and defining with said second pivot a third lever arm, a connection between said second lever and said inertia means and defining with said second pivot a fourth lever arm, whereby control from the pilot's control actuates said pitch control arm by bodily movements of said second pivot about said fixed fulcrum, and whereby control from said inertia means actuates said pitch control arm by movements of said second lever about said second pivot.

4. A helicopter rotor system as recited in claim 3, in which the said first lever arm is longer than said second lever arm to minimize reactions on said pilot's control from inertia bar control.

5. A helicopter rotor system comprising a rotatable unit, a plurality of rotor blades pivoted for flapping on said unit, pitch control means associated with the respective blades for exerting pitch changing control thereon, rigid datum plane means rotatable with the unit, tilting support means pivoted to the datum plane means, said datum plane means mounting a plurality of functionally fixed fulcrum pivot means in a datum plane always normal to the axis of rotation of said unit, leverage mixing means basically centered on each of the said fulcrum pivot means, support means mounted fixedly on the unit, inertia means mounted movably on the support means and having a rotative plane, pilot's control swash plate means rotatable with said unit, pilot's control means for tilting the swash plate means, means for changing the elevation of the swash plate means on the unit, a diametrically spaced pair of links between said swash plate means and said tilting support means to change the elevation of said datum plane means in synchronism with change in elevation of the swash plate means, a plurality of links respectively extending from said swash plate means to the respective leverage mixing means to actuate same cyclically in accordance with the pilot-controlled attitude of the swash plate means, a plurality of links respectively extending from the inertia means to the respective leverage mixing means to actuate same cyclically in accordance with the attitude of the rotative plane of the inertia means to the axis of rotation of said unit, a plurality of pitch control links extending between said leverage mixing means and said respective pitch control means.

6. A helicopter rotor system as recited in claim 5, and means for damping the inertia means against angular change of its plane of rotation.

References Cited in the file of this patent

UNITED STATES PATENTS

| | | |
|---|---|---|
| 2,368,698 | Young | Feb. 6, 1945 |
| 2,384,516 | Young | Sept. 11, 1945 |
| 2,427,939 | Woods | Sept. 23, 1947 |
| 2,481,750 | Hiller et al. | Sept. 13, 1949 |
| 2,529,479 | Bates | Nov. 14, 1950 |
| 2,633,924 | Young | Apr. 7, 1953 |